(12) United States Patent
Beale

(10) Patent No.: X7056
(45) Date of Patent: May 12, 1832

(54) CARRIAGES, DISENGAGING HORSES FROM

(76) Inventor: Robert Beale

Robert Beale

The schedule referred to in these Letters Patent and making part of the
same containing a description in the words of the said Robert Beale himself of his
improvement in Carriages, by which the horses may be suddenly disengaged when running
away; or whenever required, to be detached from the carriage quickly: called the safety Carriage.
Be it known, that I Robert Beale of the City of Washington in the District of
Columbia, have made an improvement in Carriages, by which the horses may be suddenly
disengaged when running away; or whenever required, to be detached from the carriage quickly
called the safety carriage, which is described as follows
The singletree is attached to the cross bar by an iron fixture called a jointed clasp
formed thus,  the lower part marked A resting against the back of the crossbar.
This jointed clasp is held up against the under side of the cross bar by an iron shutter or hinged clasp
formed thus  turning on a joint or hinge secured to the under side of the
cross bar. To the end of the hinged clasp is attached an iron rod or bolt, B. with an
eye at its end. This rod or bolt passes thro' an opening in the cross bar (and has an iron spring
key inserted thro' the eye resting on the upper side of the bar [illegible]; + which secures +
the jointed-clasp from dropping. Or the rod may be fixed permanently
in the cross bar projecting far enough below it to pass thro' a slot or mortice
in the end of the hinged clasp, with a spring-key inserted through the end of
the rod or bolt to prevent the hinged-clasp falling. To the end of the spring-
key is attached a cord which leads inside of the carriage where it hangs loosely.
Should the horse take fright and become unmanageable then the
cord is to be pulled suddenly which will draw the spring-key from the eye
of the rod or bolt, let fall the hinge clasp, and with it the jointed clasp
attached to the single-tree, and will disengage the horse from the carriage.
The tugs are open in front thus , to allow the breeches to slip
off freely. This breeches is made from a single strap of leather, with rings
sewed to the ends to hook over the tugs.

The shutter or hinge clasp may have its end turned up at right angles
and formed like a catch or hook, and secured by a spring fastened to the
side of the cross bar; the cord being attached to the end of the spring. The
shutter may indeed be held up in a great variety of modes but the before

[illegible]

described are sufficient to show the principle of my invention.
When it is desired to retain the singletree and let the horse go off with the
traces only then a hinged clasp must be put on each end of the swingletree
with the jointed clasps secured to the ends of the traces, and the cords attached
to the Spring keys run through pulleys and are joined to the single cord
which leads inside of the Carriage.–
In the two horse carriage the Shutters or hinged clasps are hung on the
under side of the whipple-tree, and the chords attached to the spring-
keys run along on the top of the whipple tree in a straight line; then
pass around pulleys and are joined to the single chord which leads
inside or outside of the carriage. The pulleys are to cause the cords to
run freely and to draw the Spring keys or pins from the eyes of the
rods or bolts in a straight line – An iron tube with a flange on one
end is fastened to the end of the pole. Over this is put a thimble having a
ring on each side to which the breast straps are attached. This thimble
slips off the end of the pole when the horses are disengaged. The mode of
detaching the horses from the two horse carriage is similar to that describ-
ed for a single horse carriage.–
In a four horse Carriage the leaders are disengaged from the pole in
the same manner by a jointed clasp, hinged clasp springkey and cord,
as described for a two horse carriage.
The jointed clasp may be held up against the crossbar by a pin inserted
through the jointed clasp into the hind part of the cross bar · to which pin
the chord is attached.
The jointed clasp may also be secured by a spring fastened on the hind
part of the cross bar, the cord being attached to the end of the spring.
Springs or friction levers are secured to the carriage and brought in
contact with the hub in order to decrease the motion of the Carriage when
the horses are liberated, or before they are liberated.
This invention may be applied to field artillery, and which will enable
the men to limber or unlimber the gun in less than half a minute.
It may be applied to carriages and waggons of every description.. to Ploughs, harrows, and all kinds of agricultural implements drawn by horses, when required to be taken in haste from the carriage to fuel &c.

A forked piece of iron is suspended over the hound and front axle-tree to prevent its turning on the body bolt.

What I claim as my invention, and which I wish to secure by Letters Patent, is the before described apparatus for suddenly disengaging horses from Carriages &c.

For a further illustration of my invention, I refer to the Models and Drawings of the same deposited in the Patent Office.

In witness whereof I have hereunto subscribed my name at the City of Washington, this tenth day of May, 1832.

Robert Beale

Witnesses
William Wheat
William Wallis 1087 words E